2,826,578

THERAPEUTIC AGENTS

Yvon Gaston Perron, East Syracuse, N. Y., assignor to Bristol Laboratories Inc., Syracuse, N. Y., a corporation of New York No Drawing. Application May 4, 1956
Serial No. 582,665

7 Claims. (Cl. 260—247.2)

This invention relates to amides of trihaloacetic acid of therapeutic value, e. g. as non-hypnotic sedatives and clinical tranquillizers and, more particularly, to N-substituted-amino-alkylamides of trihaloacetic acid.

There is provided according to the present invention a compound selected from the group consisting of a free base having the formula

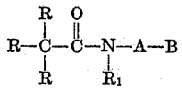

wherein R represents halogen; $R_1$ is a member selected from the group consisting of hydrogen, (lower)alkyl, 3,4-dimethoxybenzyl and benzyl; A is a member selected from the group consisting of bivalent, saturated hydrocarbon radicals containing from two to six carbon atoms inclusive, and B is a member selected from the group consisting of piperidino, morpholino, 2,6-dimethylmorpholino, N'-(lower)alkylpiperazino, pyrrolidino, pipecolino, dicycloalkylamino, dibenzylamino, N-benzyl-N-(lower)-alkylamino, and di(lower)alkylamino; and non-toxic acid addition salts thereof.

Examples of non-toxic acid addition salts of said free bases with inorganic and organic acids, which may be prepared by the methods hereinafter disclosed, are the hydrochloride, hydrobromide, hydroiodide, sulfate, phosphate, maleate, acetate, citrate, oxalate, succinate, benzoate, tartrate, fumarate, mandelate, malate, ascorbate, 8-chlorotheophyllinate and the like. These acid addition salts are converted to the free base by solution in a solvent, e. g. water, followed by the addition of one equivalent of alkali, e. g. sodium hydroxide. If desired, the free base is collected by filtration, decantation or solvent extraction. Such free base is converted to an acid addition salt by treatment with one equivalent of acid in water for example.

The compounds of this invention are useful as pharmaceuticals and as pharmaceutical intermediates. More specifically, compounds of this invention are non-hypnotic sedatives and clinical tranquillizers of use in anxiety states, neuroses, emotional disturbances, insomnia, hypertension and the like. The compounds of the present invention also possess other valuable therapeutic properties as local anesthetics, analgesics and as potentiators of drugs active in the central nervous system.

The compounds of the invention are readily prepared by reacting a trihaloacetic acid halide, ester or azide with the appropriate aminoalkyl(tertiary)amine. Alternatively, the amide of a trihaloacetic acid is metallated, e. g. with sodium amide or lithium amide, and then reacted with the appropriate tertiary amino-alkyl halide.

The following examples are given to illustrate the scope of this invention without limiting it thereto.

Example I

A solution of 13 g. (0.1 mole) of N-(β-aminoethyl)-morpholine in 50 cc. benzene is added slowly, with stirring, to a solution of 18.2 g. (0.1 mole) of trichloroacetyl chloride in 100 cc. benzene. After an exothermic reaction, 4 - [2-(N-trichloroacetamidoethyl)]-morpholine hydrochloride precipitates in crystalline form, is recrystallized from methanol-isopropanol and found to melt at about 198°–200° C. (dec.). Yield: 27 grams (87%).

Analysis.—Calc'd for $C_8H_{13}Cl_3N_2O_2 \cdot HCl$: C, 30.77; H, 4.48. Found: C, 30.9; H, 4.67.

The corresponding free base is prepared by dissolving this product in water and adding one equivalent of alkali, e. g. sodium hydroxide.

Example II

A solution of 13 g. of N-(β-aminoethyl)-piperidine in 50 cc. benzene is added slowly with stirring to a solution of 18 g. of trichloroacetyl chloride in 100 cc. benzene. After an exothermic reaction, the reaction mixture is cooled and the precipitated 1-[2-(N-trichloroacetamidoethyl)]piperidine hydrochloride is collected by filtration.

Example III

A solution of 13 g. of β-aminoethyl-dimethylamine in 50 cc. benzene is added slowly with stirring to a solution of 18 g. of trichloroacetyl chloride in 100 cc. benzene. After an exothermic reaction, the reaction mixture is cooled and the precipitated N-trichloroacetamidoethyl-dimethylamine hydrochloride is collected by filtration.

Example IV

A solution of 13 g. of β-methylaminoethyl-dimethylamine in 50 cc. benzene is added slowly with stirring to a solution of 18 g. of trichloroacetyl chloride in 100 cc. benzene. After an exothermic reaction, the reaction mixture is cooled and the precipitated N-methyl-N-(β-dimethylaminoethyl)-trichloroacetamide hydrochloride is collected by filtration.

Example V

A solution of 13 g. of N-(γ-aminopropyl)pyrollidine in 50 cc. benzene is added slowly with stirring to a solution of 18 g. of trichloroacetyl chloride in 100 cc. benzene. After an exothermic reaction, the reaction mixture is cooled and the precipitated 1-[3-(N-trichloroacetamidopropyl)]pyrrole hydrochloride is collected by filtration.

Example VI

A solution of 13 g. of N-(β-aminoethyl)-piperidine in 50 cc. benzene is added slowly with stirring to a solution of 18 g. of tribromoacetyl bromide in 100 cc. benzene. After an exothermic reaction, the reaction mixture is cooled and the precipitated 1-[2-(N-tribromoacetamidoethyl)]piperidine hydrobromide is collected by filtration.

Example VII

A solution of 13 g. of N-(β-aminoethyl)-piperidine in 50 cc. benzene is added slowly with stirring to a solution of 18 g. trifluoroacetyl chloride in 100 cc. benzene. After an exothermic reaction, the reaction mixture is cooled and the precipitated 1-[2-(N-trifluoroacetamidoethyl)]-piperidine hydrochloride is collected by filtration.

Example VIII

A solution of 21.6 g. (0.15 mole) of N-(γ-aminopropyl)-morpholine in 50 cc. benzene is added slowly, with stirring and cooling to 27.3 g. (0.15 mole) of trichloroacetyl chloride in 150 cc. benzene. The product, 4 - [3-(N-trichloroacetamidopropyl)]-morpholine hydrochloride, precipitates in colorless crystalline form, is collected by filtration, recrystallized from methanol, and found to be very soluble in cold water and to melt at about 203°–204° C. (dec.).

Analysis.—Calc'd for $C_9H_{15}Cl_3N_2O_2 \cdot HCl$: C, 33.13; H, 4.90. Found: C, 33.7; H, 5.23.

The corresponding free base is prepared by dissolving this product in cold water and adding one equivalent of alkali, e. g. sodium hydroxide.

*Example IX*

A solution of 130 g. N-(β-aminoethyl)-morpholine in 150 cc. benzene is added with stirring to a solution of 166.2 g. veratraldehyde in 150 cc. benzene. The temperature of the mixture rises to about 70° C. and water is formed and separated. The benzene is removed by distillation and the N-(3,4-dimethoxybenzylidene)-(β-aminoethyl)-morpholine is distilled at about 204°-206° C./2.3 mm. (258 g. of viscous yellow oil). Two hundred grams of this imine are hydrogenated in about 100 cc. methanol at room temperature and 70 pounds pressure of hydrogen, using Raney nickel (100 g. wet catalyst). The absorption of hydrogen stopped after 36 hours shaking. The catalyst was removed, the methanol evaporated and the residual oil distilled in vacuo to give 95 grams of the colorless diamine 4-[2-(3,4-dimethoxybenzylamino)-ethyl]-morpholine, B. P. 197°-200° C./2.2 mm. (M. P. of dihydrochloride 244°-245° C.).

To a solution of 15 g. of trichloroacetyl chloride in 100 cc. acetone there is added slowly with stirring 20 g. of this diamine in 50 cc. acetone. There is obtained a clear, boiling solution from which there crystallizes out on cooling the product N-(β-morpholinoethyl)-N-(3,4-dimethoxybenzyl) - trichloroacetamide hydrochloride which is collected by filtration, recrystallized from methanol and obtained as colorless crystals, M. P. 201°-203° C. (dec.).

*Analysis.*—Calc'd for $C_{17}H_{23}N_2O_4Cl_3 \cdot HCl$: C, 44.15; H, 5.19. Found: C, 44.2; H, 5.20.

*Example X*

The colorless, crystalline product, N-(β-morpholinoethyl)-N-benzyl-trichloroacetamide hydrochloride, is prepared by following the procedure of Example 9, replacing the veratraldehyde with benzaldehyde.

*Example XI*

A solution of 13 g. of N-(β-aminoethyl)-2,6-dimethylmorpholine in 50 cc. benzene is added slowly with stirring to a solution of 18 g. of trichloroacetyl chloride in 100 cc. benzene. After an exothermic reaction, the mixture is cooled and the precipitated 2,6-dimethyl-4-[2-(N-trichloroacetamidoethyl)]morpholine hydrochloride is collected by filtration.

*Example XII*

A solution of 13 g. of N-(β-aminoethyl)-alpha-pipecoline in 50 cc. benzene is added slowly with stirring to a solution of 18 g. of trichloroacetyl chloride in 100 cc. benzene. After an exothermic reaction, the mixture is cooled and the precipitated 1-[2-(N-trichloroacetamidoethyl)]-alpha-pipecoline hydrochloride is collected by filtration.

I claim:

1. A compound selected from the group consisting of a free base having the formula

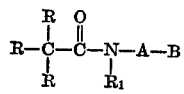

wherein R represents halogen; $R_1$ is a member selected from the group consisting of hydrogen, (lower)alkyl, 3,4-dimethoxybenzyl and benzyl; A is a member selected from the group consisting of bivalent, saturated hydrocarbon radicals containing from two to six carbon atoms inclusive, and B is a member selected from the group consisting of piperidino, morpholino, 2,6-dimethylmorpholino, pyrrolidino, pipecolino, and di(lower)alkylamino; and non-toxic acid addition salts thereof.

2. A compound selected from the group consisting of a free base having the formula

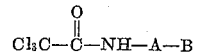

wherein A is a member selected from the group consisting of bivalent, saturated hydrocarbon radicals containing from two to six carbon atoms inclusive and B represents di(lower)alkylamino.

3. A compound selected from the group consisting of a free base having the formula

wherein A is a member selected from the group consisting of bivalent, saturated hydrocarbon radicals containing from two to six carbon atoms inclusive and B represents morpholino.

4. A compound selected from the group consisting of a free base having the formula

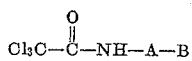

wherein A is a member selected from the group consisting of bivalent, saturated hydrocarbon radicals containing from two to six carbon atoms inclusive and B represents piperidino.

5. A compound selected from the group consisting of a free base having the formula

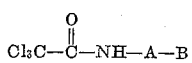

wherein A is a member selected from the group consisting of bivalent, saturated hydrocarbon radicals containing from two to six carbon atoms inclusive and B represents pyrrolidino.

6. A compound selected from the group consisting of a free base having the formula

wherein A is a member selected from the group consisting of bivalent, saturated hydrocarbon radicals containing from two to six carbon atoms inclusive and B represents 2,6-dimethylmorpholino.

7. 4 - [2-(N-trichloroacetamidoethyl)]-morpholine hydrochloride.

References Cited in the file of this patent

Huang et al.: J. Am. Chem. Soc., vol. 74, pp. 101–5 (1952).